(12) United States Patent
Grillo et al.

(10) Patent No.: US 6,945,893 B2
(45) Date of Patent: Sep. 20, 2005

(54) HYBRID POWERTRAIN SYSTEM

(75) Inventors: Ricardo C. Grillo, Portage, MI (US); Walter K. O'Neil, Southfield, MI (US); David M. Preston, Clarkston, MI (US)

(73) Assignee: Eaton Corporation, Cleveland, OH (US)

( * ) Notice: Subject to any disclaimer, the term of this patent is extended or adjusted under 35 U.S.C. 154(b) by 83 days.

(21) Appl. No.: 10/156,513

(22) Filed: May 28, 2002

(65) Prior Publication Data

US 2003/0221515 A1 Dec. 4, 2003

(51) Int. Cl.[7] ............................. F16H 3/72; F16H 3/08
(52) U.S. Cl. .................................... 475/5; 74/331
(58) Field of Search ................... 475/5, 2, 3; 74/331, 74/661; 120/65.2, 65.4, 65.7

(56) References Cited

U.S. PATENT DOCUMENTS

| | | | |
|---|---|---|---|
| 2,906,139 | A | 9/1959 | Ferchl et al. |
| 4,375,171 | A | 3/1983 | Morscheck ................. 74/331 |
| 4,531,605 | A * | 7/1985 | Scholz et al. .......... 180/65.2 X |
| 4,648,283 | A * | 3/1987 | Janson ..................... 74/473.24 |
| 4,754,665 | A | 7/1988 | Vandervoort ................. 74/745 |
| 5,315,218 | A | 5/1994 | Fortune et al. |
| 2002/0033059 | A1 | 3/2002 | Pels et al. |
| 2002/0040818 | A1 * | 4/2002 | Maruyama ................. 180/65.2 |
| 2002/0189397 | A1 * | 12/2002 | Sakamoto et al. ............ 74/661 |
| 2003/0045389 | A1 * | 3/2003 | Kima ............................ 475/5 |
| 2003/0051577 | A1 * | 3/2003 | Hirt ........................ 74/331 X |
| 2003/0166429 | A1 * | 9/2003 | Tumback ....................... 475/5 |

FOREIGN PATENT DOCUMENTS

| | | |
|---|---|---|
| DE | 922 508 | 1/1955 |
| DE | 199 60 621 A1 | 6/2001 |
| DE | 101 08 881 A1 | 9/2002 |
| EP | 492152 A1 * | 7/1992 ............... 180/65.2 |
| EP | 0 756 113 A1 | 1/1997 |
| FR | 2 805 221 A1 | 8/2001 |
| FR | 2 811 395 A1 | 1/2002 |

OTHER PUBLICATIONS

Derwent English Abstract for DE 101 08 881 A1.
Derwent English Abstract for DE 199 60 621 A1.
Derwent English Abstract for FR 2 811 395 A1.
Derwent English Abstract for FR 2 805 221 A1.
International Search Report, 3 pages.

* cited by examiner

*Primary Examiner*—Roger Pang
(74) *Attorney, Agent, or Firm*—Rader, Fishman & Grauer PLLC

(57) ABSTRACT

A hybrid powertrain system is provided that includes a first prime mover having a rotational output, a second prime mover having a rotational output, and a transmission having a main shaft supporting at least two main shaft gears thereon. The transmission includes a first independent countershaft drivingly connected to the first prime mover and including at least one ratio gear supported thereon that meshes with a respective main shaft gear. A second independent countershaft is drivingly connected to the second prime mover and includes at least one ratio gear supported thereon that meshes with a respective main shaft gear. The ratio gears on the first and second countershafts cooperate with the main shaft gears to provide at least one gear ratio between the first and second countershafts and the main shaft. A shift control mechanism selectively engages and disengages the first and second countershafts for rotation with the main shaft.

39 Claims, 12 Drawing Sheets

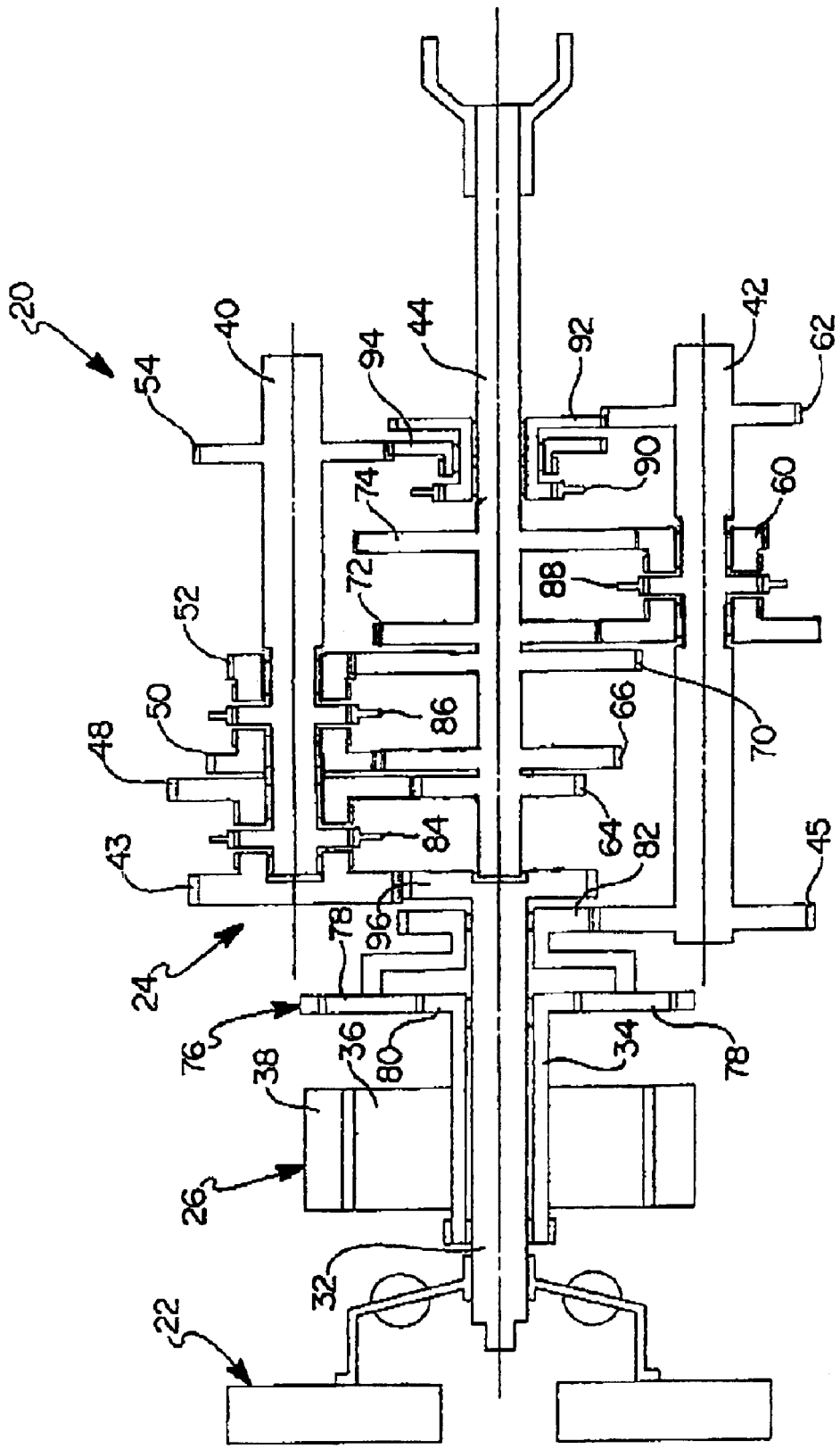

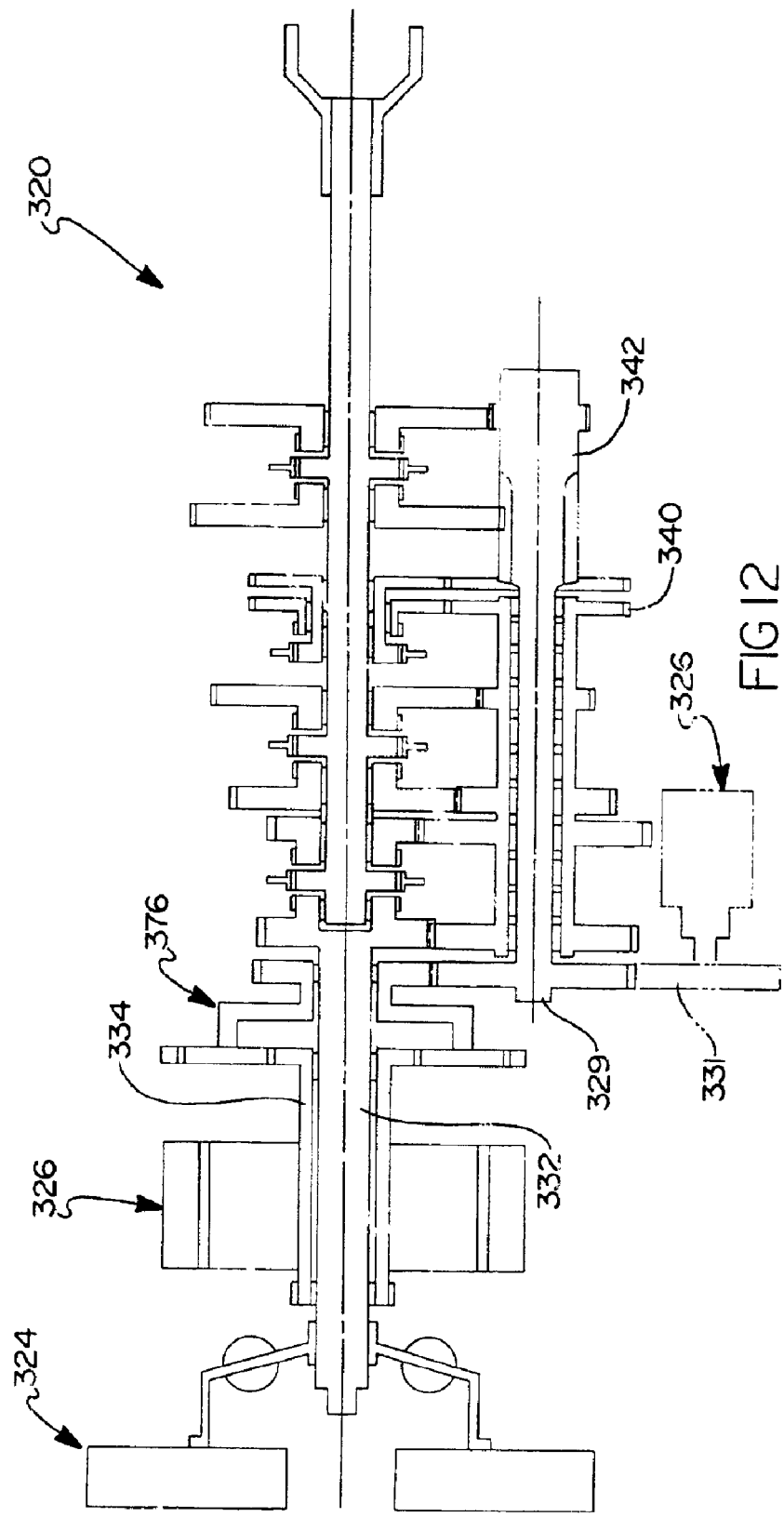

HYBRID POWERTRAIN SYSTEM

This invention was made with Government support under NREL Subcontract No. ZCL-2-32060-01, Prime Contract DE-AC36-99 GO10337 awarded by the Department of Energy. The government has certain rights in this invention.

BACKGROUND OF THE INVENTION

1. Field of the Invention

The present invention relates generally to powertrain systems and, more particularly, to a hybrid powertrain system employing at least two prime movers and a dual independent countershaft transmission.

2. Description of the Related Art

Hybrid vehicle powertrain systems employing two or more prime movers to drive the vehicle are well known in the art. Previous hybrid powertrain systems have utilized an internal combustion engine that is strategically operated in combination with an electric motor to provide driving torque to the wheels of the vehicle.

So-called "parallel hybrid" powertrain systems have been developed that commonly interface the electric motor in line between the vehicle engine and the transmission. In one known parallel hybrid system, the motor rotor is coupled directly to the engine output shaft. In this type of parallel hybrid powertrain, a main clutch must be operated conventionally to disengage the engine from the transmission. Such use of a conventional clutch precludes the ability to powershift the transmission, i.e., shift the transmission while retaining drive torque on the transmission output shaft, which is preferable to maximize driver comfort and facilitate smooth, rapid acceleration of the vehicle. Another limitation of this type of parallel hybrid powertrain system is that it requires a high torque, low speed electric motor to match the relatively low speed of the engine.

In another known parallel hybrid powertrain system, the torque output produced from an internal combustion engine and the torque output produced from an electric motor are combined in a torque composition mechanism, such as a planetary gear train. The combined torque output is then transmitted, via a conventional transmission, to the drive wheels. A limitation of this type of powertrain system is that the output torque of the engine and motor must be precisely controlled to balance one another during steady state operation. Another limitation of this type of powertrain system is that regenerative braking of the vehicle requires complex hardware and control systems.

SUMMARY OF THE INVENTION

A hybrid vehicle powertrain system is provided that includes a first prime mover having a rotational output, a second prime mover having a rotational output, and a transmission having a main shaft supporting at least two main shaft gears thereon. The transmission further includes a first independent countershaft drivingly connected to the first prime mover and including at least one ratio gear supported thereon that meshes with a respective main shaft gear. A second independent countershaft is drivingly connected to the second prime mover and includes at least one ratio gear supported thereon that meshes with a respective main shaft gear. The ratio gears on the first and second countershafts cooperate with the main shaft gears to provide at least one gear ratio between each of the first and second countershafts and the main shaft. This feature enables the main shaft to be engaged for rotation with the first prime mover driven countershaft alone, the second prime mover driven countershaft alone, or both countershafts together. A shift control mechanism selectively engages and disengages the main shaft for rotation with the first and second countershafts.

One feature of the present invention is that either one of the first and second prime mover driven countershafts may be selectively operated to maintain torque at the drive wheels of the vehicle while the other prime mover driven countershaft is undergoing a gear interchange with the main shaft. This feature advantageously improves shift quality and enables automated power shifting of the transmission. Another feature of the present invention is that the second prime mover is operable to provide the sole power to launch and propel the vehicle without a main clutch. The second prime mover is also operable to supply the sole driving power during reverse operation of the vehicle, thereby eliminating the need for a reverse idler gear in the transmission. Furthermore, the power output of the second prime mover and the first prime mover may be combined to drive the vehicle.

In yet another feature of the present invention, the second prime mover may be operated to recover energy by recharging an energy storage device during vehicle deceleration. Additionally, the second prime mover may be coupled directly to the first prime mover, independent of the main shaft, through a selectively engageable connecting gearset. This feature allows the first prime mover to drive the second prime mover to recharge the energy storage device or to produce auxiliary power for on-board or off-board vehicle use while the vehicle is at rest. This feature also allows the second prime mover to be operated as a starter motor when the first prime mover functions as an engine.

Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

FIGS. 2 and 2A are schematic illustrations of a hybrid powertrain system according to embodiments of the present invention.

FIG. 12 is a schematic illustration of an alternate embodiment of the hybrid powertrain system shown in FIG. 11.

DESCRIPTION OF THE PREFERRED EMBODIMENTS

Figure 1:
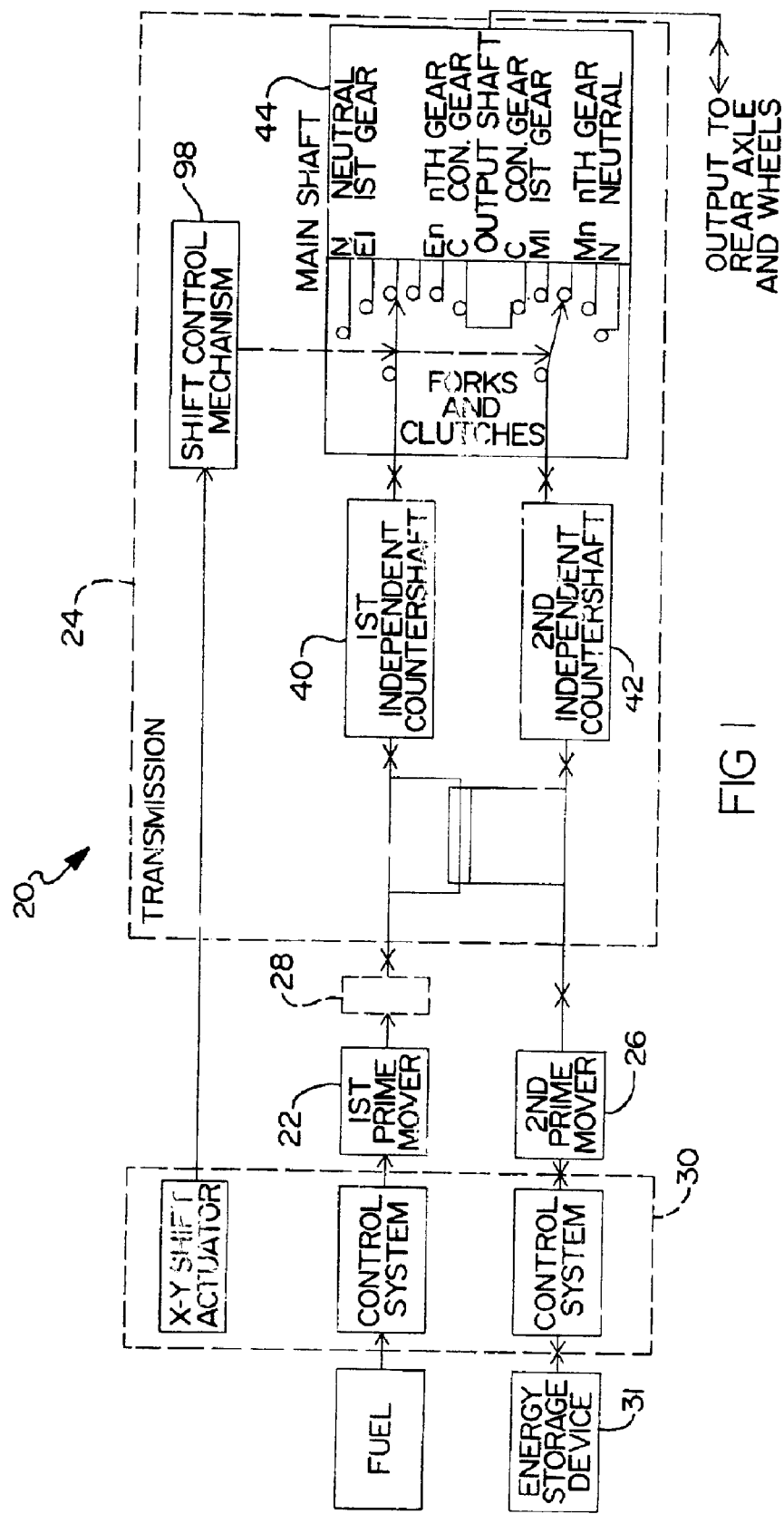
FIG. 1 is a diagrammatic representation of a hybrid powertrain system according to the present invention.

Referring now to the drawings, the preferred embodiments of the present invention are shown in detail. Referring to FIG. 1, a hybrid powertrain system 20 is provided that includes a first prime mover 22, such as a spark-ignited or compression-ignited internal combustion engine, a change-gear transmission 24 and a second prime mover 26, such as an electric motor/generator or a hydraulic motor/pump. Optionally, hybrid powertrain system 20 may be provided with a main clutch 28 (shown in phantom), such as a master friction clutch, which can be selectively operated to disengage first prime mover 22 from transmission 24.

An electronic control unit (ECU) 30 is incorporated into powertrain system 20 to provide control for first prime mover 22, second prime mover 26 and transmission 24. ECU 30 preferably includes a conventional programmable digital computer (not shown) that is configured to receive various input signals, including, but not limited to, the operating speeds of first and second prime movers 22 and 26, transmission input speed, selected transmission ratio, transmission output speed and vehicle speed, to control operation of powertrain system 20. For example, ECU 30 may be programmed to deliver fuel to first prime mover 22 when first prime mover 22 functions as an internal combustion engine. It will be appreciated, however, that the present invention is not intended to be limited to any particular type or configuration of ECU 30 or to any specific control logic for governing operation of powertrain system 20.

When second prime mover 26 functions as an electric motor/generator or hydrualic motor/pump, powertrain system 20 includes an energy storage device 31 to provide the energy required to operate second prime mover 26. Energy storage device 31 may include, for example, a battery, a bank of batteries or a capacitor when second prime mover 26 functions as an electric motor/generator or, alternatively, a hydraulic accumulator when second prime mover 26 functions as a hydraulic motor/pump. ECU 30 may be programmed to selectively and variably provide second prime mover 26 in communication with energy storage device 31, when operation of second prime mover 26 is desired.

Figure 2:
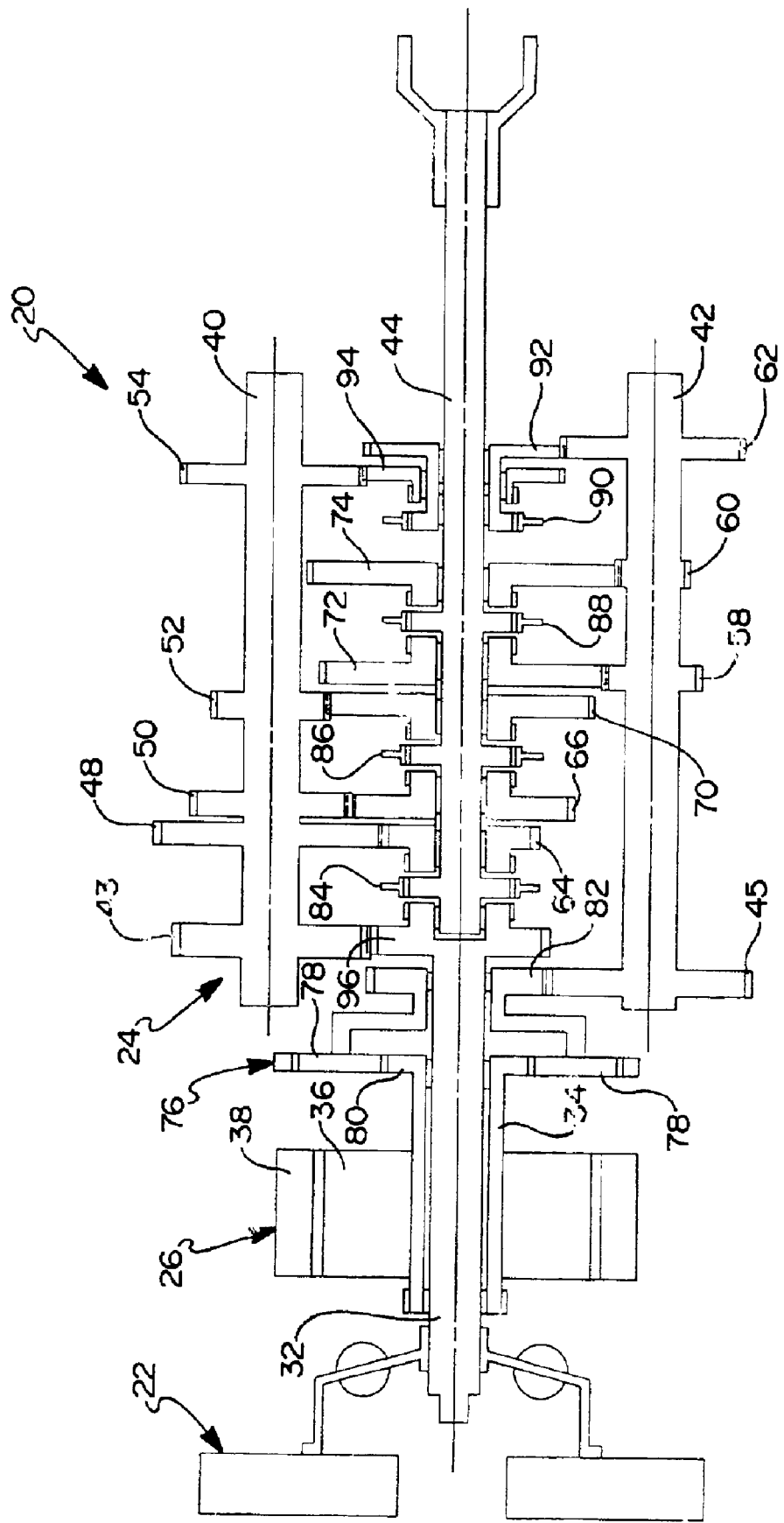

Referring to FIG. 2, a preferred embodiment of powertrain system 20 will be described in detail. In this embodiment, first prime mover 22 is drivingly connected to a first transmission input shaft 32 that is disposed concentrically within a second transmission input shaft 34 driven by second prime mover 26. During operation of powertrain system 20, first transmission input shaft 32 rotates independently of second input shaft 34. When second prime mover 26 functions as a motor/generator, as illustrated in FIG. 2, second input shaft 34 is connected for rotation with a rotor 36, which is electrically driven by a stator 38, as is known in the art. As noted above, operation of second prime mover 26 is not limited to that of a motor/generator, and other means of applying rotational power to second transmission input shaft 32, such as a hydraulic motor/pump, are within the scope of this invention.

As further illustrated in FIG. 2, transmission 24 includes first and second independent countershafts 40 and 42, respectively, that are rotatably supported by a transmission housing (not illustrated), and a main shaft 44 that is also rotatably supported by the transmission housing. The axes of main shaft 44 and countershafts 40, 42 are substantially parallel, and the axis of first transmission input shaft 32 is substantially co-axial with the axis of main shaft 44. Although first and second countershafts 40, 42 are shown in FIG. 2 as being substantially equidistantly spaced from main shaft 44, one of first and second countershafts 40, 42 may be positioned closer to main shaft 44 to maximize the overall economy in gear ratios and gear wheel count. Moreover, as illustrated schematically in FIG. 1, the mechanical inputs to independent countershafts 40, 42 may be concentric, as described above, or direct, as will be described below.

First countershaft 40, which is rotatably driven by first prime mover 22 via first transmission input shaft 32 and a headset gear 43, provides a first torque path between first prime mover 22 and main shaft 44. Second countershaft 42, which is rotatably driven by second prime mover 26 via second transmission input shaft 34 and a headset gear 45, provides a second torque path between second prime mover 26 and main shaft 44. In an exemplary embodiment, first countershaft 40 carries thereon a plurality of ratio gears 48, 50, 52 and 54, whereas second countershaft 42 carries thereon ratio gears 58, 60 and 62. Ratio gears 64, 66 and 70 are rotatably supported on main shaft 44 and are continually meshed with ratio gears 48, 50 and 52, respectively, on first countershaft 40. Similarly, ratio gears 72 and 74 are rotatably supported on main shaft 44 and are continually meshed with ratio gears 58 and 60, respectively, on second countershaft 42. The term "gear," as stated herein, is used to define the toothed wheels illustrated in FIG. 2, as well as manufacturing the toothed features of the wheel directly into first and second countershafts 40, 42 and main shaft 44.

Ratio gears 48, 50 and 52 provide three "speeds" on first countershaft 40, although first countershaft 40 and main shaft 44 could be configured with any number of gears and corresponding "speeds." Ratio gears 58 and 60 provide two "speeds" on second countershaft 42, although second countershaft 42 and main shaft 44 could be configured with any number of gears and corresponding "speeds." When first prime mover 22 functions as an engine and second prime mover 26 functions as a variable use motor, second countershaft 42 generally requires fewer ratio gears or "speeds," because the shape of a motor's torque-speed curve is generally more favorable for vehicle traction than that of an engine.

Depending on the output characteristics, e.g. torque-speed characteristics, of second prime mover 26, rotation of second transmission input shaft 34 may require a speed reduction, preferably via a planetary gear mechanism or geartrain 76. Planet gears 78 of geartrain 76 are fixed for rotation about a sun gear 80 that is secured for rotation with second transmission input shaft 34. Planet gears 78 are connected to and drive rotation of a headset gear 82, which is continually meshed with second countershaft 42 via ratio gear 56. When required, this gear reduction brings the operating speed of second prime mover 26 into an operating range of first prime mover 22. If a speed reduction is not required, second transmission input shaft 34 would drive second countershaft 42 directly through headset gear 45.

Transmission 24 also includes axially moveable clutches 84, 86 and 88, such as non-synchronized double acting dog-type clutches, that are splined to main shaft 44 for rotation therewith. Clutch 84 is selectively moveable by a conventional shift fork (not shown) in a first axial direction to fix main shaft 44 for rotation with first transmission input shaft 32. Alternatively, clutch 84 may be selectively moved in a second axial direction, opposite the first, to fix ratio gear 64 for rotation with main shaft 44. Clutch 86 may be selectively moved in opposing axial directions to rotationally fix ratio gear 66 or ratio gear 70 to main shaft 44. Clutch 88 may be selectively moved in opposing axial directions to rotationally fix ratio gear 72 or ratio gear 74 to main shaft 44.

Figure 3:
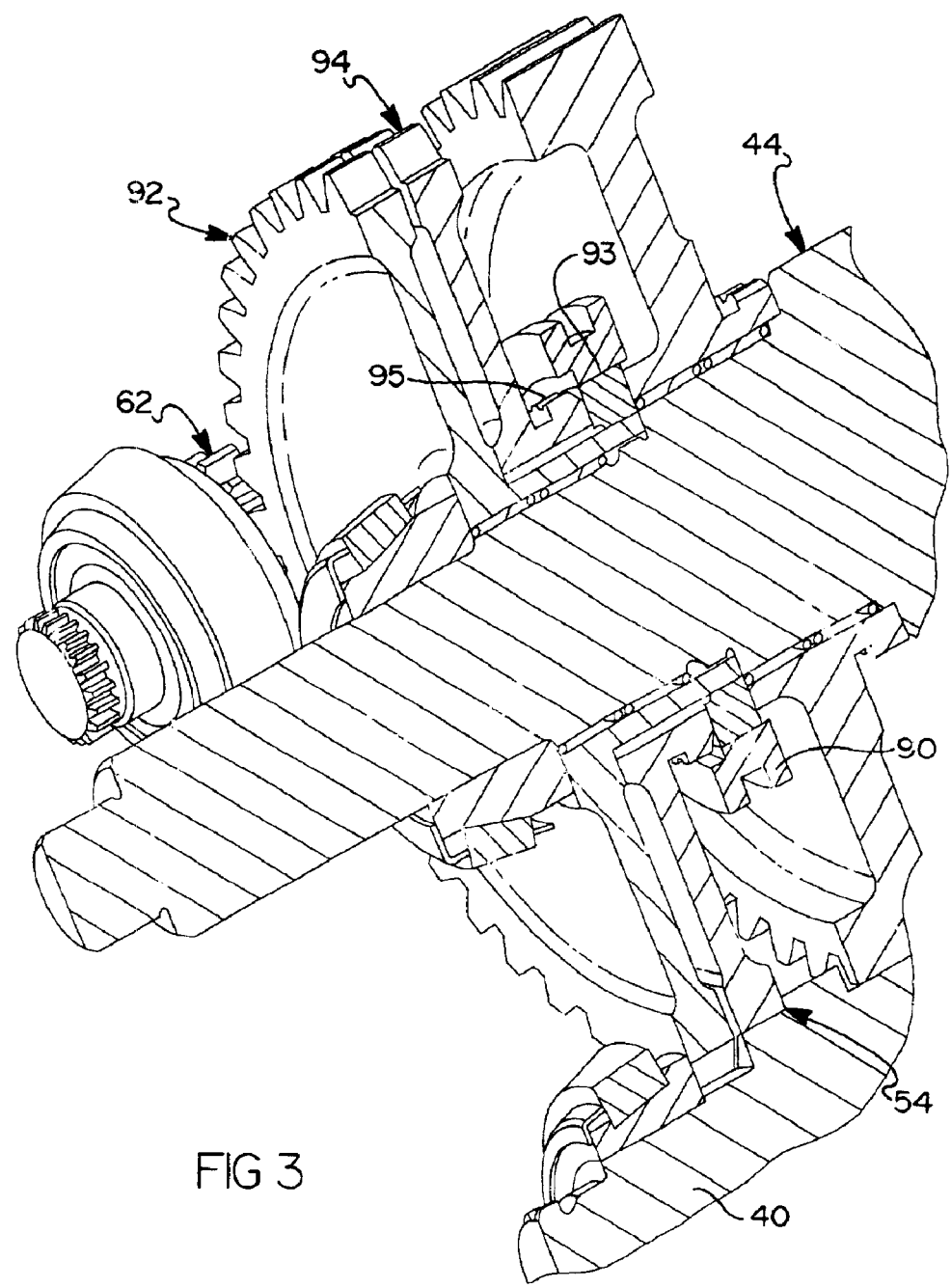
FIG. 3 is a cross-sectional view, in perspective of a connecting gearset used to fix a first transmission countershaft for rotation with a second transmission countershaft independent of the main shaft.

Clutch 90 may be selectively moved to fix first countershaft 40 for rotation with second countershaft 42. As illustrated in FIGS. 2 and 3, ratio gear 62 on second countershaft 42 meshes with a first connecting gear 92, which is rotatably supported on main shaft 44. Referring in detail to FIG. 3, first connecting gear 92 is generally L-shaped in cross-section having a splined surface 93 that extends radially outward from the base of the "L" to support clutch 90. Ratio gear 54, which is substantially similar to ratio gear 62, meshes with a second connecting gear 94 that is rotatably supported on ratio gear 92. Second connecting gear 94 is also generally L shaped in cross-section having a splined surface 95 that extends radially outward from the base of the "L." Splined surface 93 is positioned axially adjacent splined surface 95 and includes the same number of splines as splined surface 95 to allow a portion of clutch 90 to be moved axially onto splined surface 93.

Under normal operating conditions, clutch 90 is disengaged to allow gears 92 and 94 to freewheel independently of each other. However, when fixed rotation of first countershaft 40 and second countershaft 42 is desired, clutch 90 is moved axially to engage second connecting gear 94 for rotation with first connecting gear 92. Among other advantages, when first prime mover 22 functions as an engine, fixing first countershaft 40 for rotation with second countershaft 42 allows second prime mover 26 to start the engine. Additionally, because rotation of first and second connecting gears 92, 94 is independent of rotation of main shaft 44, first prime mover 22 can be used to drive second prime mover 26 to recharge energy storage device 31, without the vehicle moving.

Referring again to FIG. 2, ratio gears 60 and 74 establish a "low" gear ratio between second countershaft 42 and main shaft 44 when clutch 88 fixes ratio gear 74 for rotation with main shaft 44. Because a vehicle employing powertrain system 20 is preferably launched from rest solely under the power of second prime mover 26, this "low" gear ratio provides the highest torque output for a given torque input from second prime mover 26, which will permit launching and initial acceleration of the vehicle. This ratio also provides the highest rotational speed for second countershaft 42, which, when back driven from the vehicle wheels, can be used quickly recharge energy storage device 31 during regenerative braking of the vehicle. Ratio gears 58 and 72 establish a "high" gear ratio between second countershaft 42 and main shaft 44 when clutch 88 fixes ratio gear 72 for rotation with main shaft 44.

Ratio gears 52 and 70 establish a first and lowest gear ratio between first countershaft 40 and main shaft 44 when clutch 86 fixes ratio gear 70 for rotation with main shaft 44. This ratio provides the highest torque output for a given torque input from first prime mover 22. Ratio gears 48 and 64 establish a fourth and highest gear ratio between first countershaft 40 and main shaft 44 when clutch 84 fixes ratio gear 64 for rotation with main shaft 44. The fourth ratio provides the highest output speed for a given input speed, which will permit good vehicle fuel economy during highway driving. Cooperating gears 50, 66 and the direct drive connection between main shaft 44 and first transmission input shaft 32 establish a second and third gear ratio, respectively, when the respective clutches 86 and 84 fix gears 66 and first transmission input shaft 32 for rotation with main shaft 44. These ratios will assist in accelerating the vehicle from the low speed in the first gear ratio to the high speed in the fourth gear ratio.

A limitation of prior art transmission systems is that the output torque to the vehicle wheels significantly decreases or falls to zero during a shift interchange event. Because countershafts 40, 42 can be independently operated to provide torque to main shaft 44, second prime mover 26 may be selectively operated to maintain torque on main shaft 44 through to the drive wheels of the vehicle when a gear ratio interchange between first countershaft 40 and main shaft 44 is requested by either the vehicle operator or ECU 30. Similarly, first prime mover 22 may be selectively operated to maintain torque on main shaft 44 through to the drive wheels of the vehicle when a gear ratio interchange between second countershaft 42 and main shaft 44 is requested by either the vehicle operator or ECU 30. Powertrain system 20 also allows first prime mover 22 and second prime mover 26 to "track" the speed of main shaft 44, i.e., drivingly rotate its respective countershaft 40, 42 at a speed slightly slower than the speed required to maintain torque on main shaft 44. Permitting first and second prime movers 22 and 26 to "track" main shaft 44 enables a quick gear ratio interchange when the vehicle driver and/or ECU 30 anticipate a need to shift transmission 24.

Figure 4:
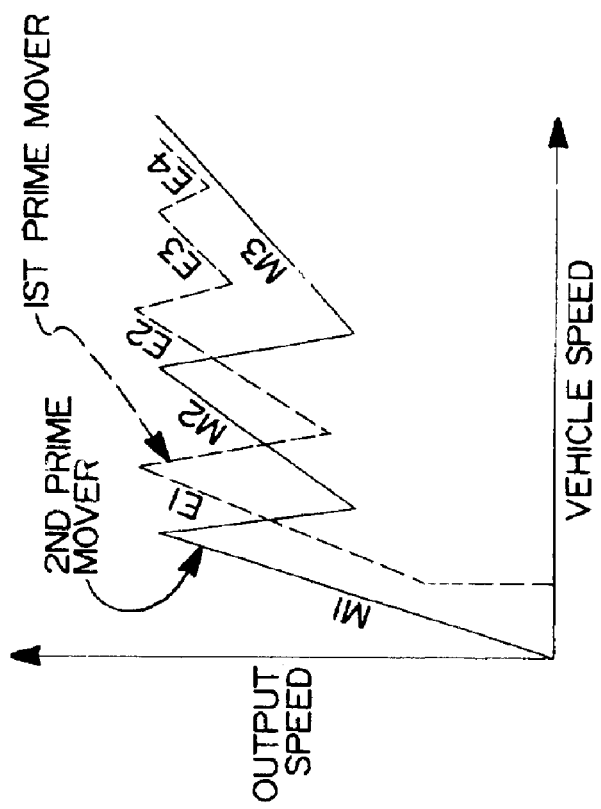
FIG. 4 is a graphical representation of the output speed versus vehicle speed characteristics of a first prime mover and a second prime mover, showing the interspersed shift points of an exemplary shift sequence.

Referring to FIG. 4, exemplary output speed versus vehicle speed characteristics of first prime mover 22 are depicted as transmission 24 operates through gear ratios E1–E4. Similarly, exemplary output speed versus vehicle speed characteristics of second prime mover 26 are depicted as transmission 24 operates through various gear ratios M1–M3. Maintaining torque on main shaft 44 during first prime mover shift intervals is supported at main shaft 44 by the maximum torque available from second prime mover 26. The shift points on second countershaft 42 are interspersed with the shift points on first countershaft 40, enabling an appropriate level of torque to be applied to main shaft 44 by first prime mover 22 during a second prime mover gear ratio interchange. Utilizing the output of either first prime mover 22 or second prime mover 26 during a shift interchange to maintain torque on main shaft 44 minimizes torque interruption at the drive wheels. This feature improves the shift smoothness and shift quality of powertrain system 20 and enables automated power shifting of transmission 24.

Another limitation of prior art transmission systems is that the driveline torque must be momentarily reduced between the main shaft and a prime mover driven ratio gear to allow a shift actuator to disengage the dog clutch from the ratio gear. Because countershafts 40, 42 can be independently operated to provide torque to main shaft 44, first prime mover 22 or second prime mover 26 may be selectively operated to provide a "torque break" to facilitate disengagement of clutches 84, 86 and 88 from a corresponding ratio gear. For example, as is known in the art, operational characteristics of a four-quadrant motor drive control permit a rapid change in the torque output of an electric motor, without a significant change in the output speed of the motor. Accordingly, when second prime mover 26 functions as an electric motor, the electric motor can be operated via the four-quadrant motor drive control to momentarily reduce the torque applied to ratio gears 72 and 74, permitting clutch 88 to be disengaged therefrom.

Similarly, first prime mover 22 may be selectively controlled by ECU 30 to momentarily reduce the torque applied to first transmission input shaft 32 and ratio gears 64, 66 and 70, permitting clutches 84 or 86 to be disengaged therefrom. Alternatively, second prime mover 26 may be selectively operated to momentarily increase the torque applied to main shaft 44, via either ratio gears 58 and 72 or ratio gears 60 and 74, enabling clutch 84 or 86 to be disengaged from the respective first prime mover driven ratio gear on main shaft 44.

As described above, ECU 30 delivers commands to the various components of powertrain system 20 based on the receipt and evaluation of various input signals. These commands may include ratio interchange commands to a shift control device (not shown) that indirectly moves clutches 84, 86, 88 and 90 to establish the gear ratios between first and second countershafts 40, 42 and main shaft 44. The shift control device may be a conventional device, such as an X-Y electromechanical shift actuator system, or any other suitable device that controls the axial position of each of clutches 84, 86, 88 and 90 through a shift control mechanism 98.

Figure 5:
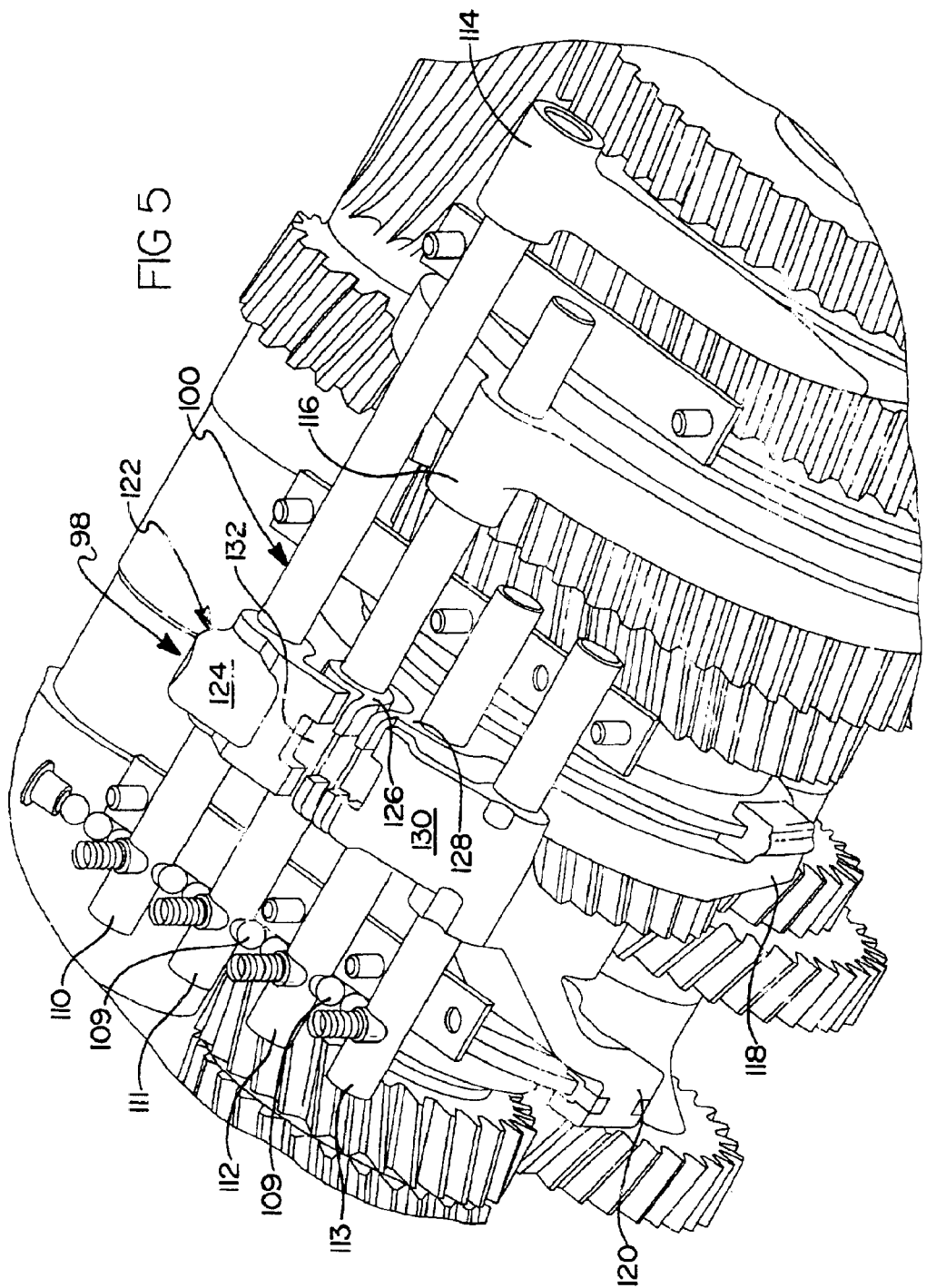
FIG. 5 is a perspective view showing a shift control mechanism of the present invention in relation to the gears of a transmission main shaft.
Figure 6:
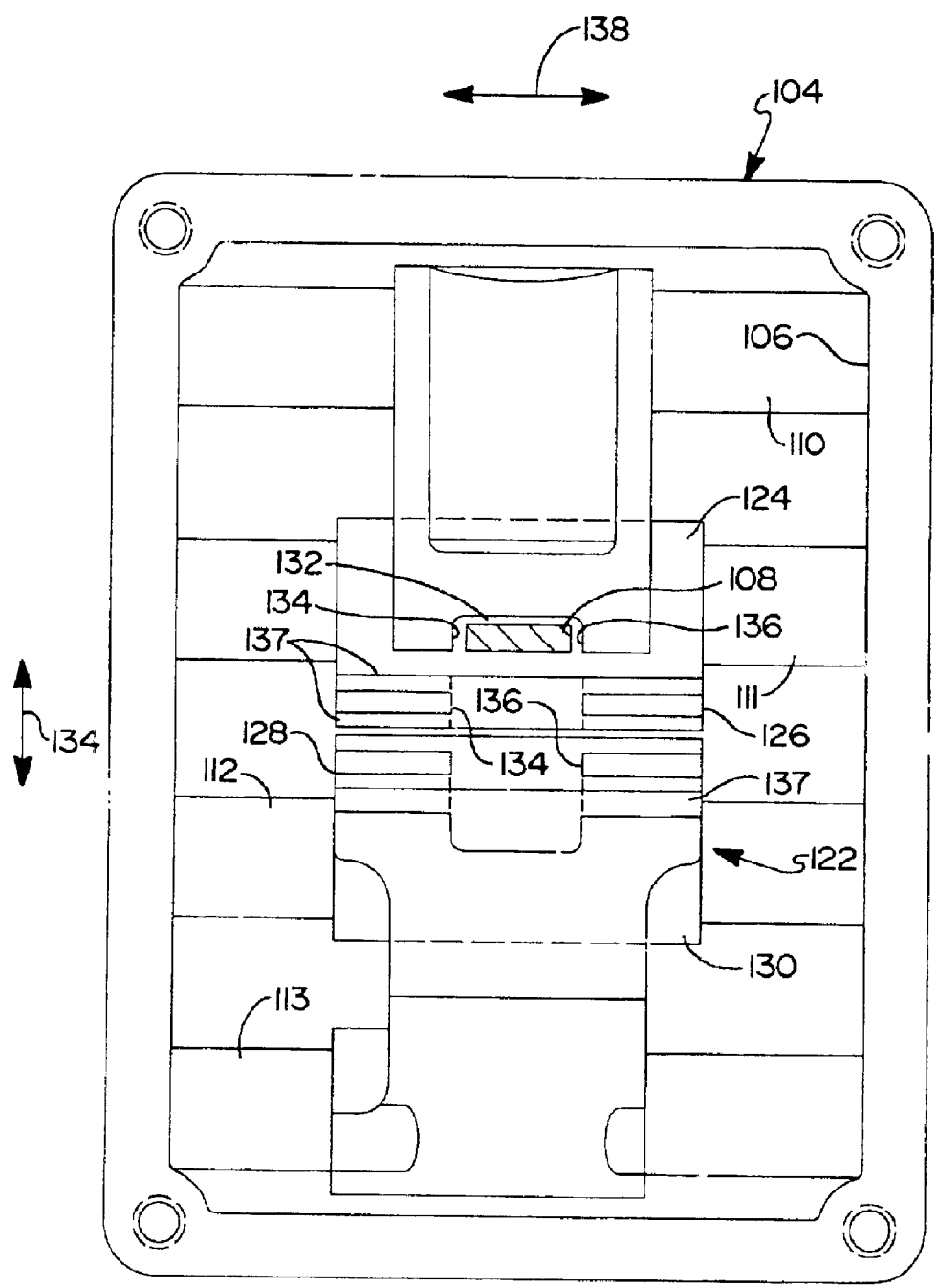
FIG. 6 is a partial top view of the shift control mechanism of FIG. 5.

Referring to FIGS. 5 and 6, shift control mechanism 98 (also shown in FIG. 1) preferably includes a shift bar assembly having shift bars or rails, generally denoted as element 100, which carry a shift fork for axial movement therewith. Shift control mechanism 98 is generally received within a shift bar housing 104, which may be integral with or attachable to the main transmission housing (not shown). Shift bar housing 104 defines an upwardly extending opening 106 through which the lower portion of a shift finger 108 may be received. In a preferred embodiment of the present invention, four shift rails 110, 111, 112 and 113 are mounted for axial movement within the shift bar assembly, although any number of shift rails 100 could be used depending on the desired number of gear ratios or gear configurations in transmission 24. An interlock mechanism 109, such as those known in the art, is provided between shift rails 110 and 111 to prevent one of shift rails 110, 111 from being moved while the other is in a position axially displaced from the neutral position. Similarly, an interlock mechanism 109 is provided between shift rails 112, 113 to prevent one of shift rails 112, 113 from being moved while the other is in a position axially displaced from the neutral position. However, unlike conventional shift bar assemblies, an interlock mechanism is not provided between shift rails 111 and 112 to allow independent control of each countershaft 40 and 42.

As illustrated in FIG. 5, shift rail 110 carries thereon a shift fork 114 for movement of clutch 90, shift rail 111 carries thereon a shift fork 116 for movement of clutch 88, shift rail 112 carries thereon a shift fork 118 for movement of clutch 86 and shift rail 113 carries thereon a shift fork 120 for movement of clutch 84. Shift forks 114, 116, 118 and 120, and the manner in which they are attached to clutches 90, 88, 86 and 84, respectively, are known in the art and will not be described in further detail herein.

Shift control mechanism 98 also includes a shift block assembly 122 that includes a first shift block member 124 secured to shift rail 110, a second shift block member 126 secured to shift rail 111, a third shift block member 128 secured to shift rail 112 and a fourth shift block member 130 secured to shift rail 113. In a neutral position, as illustrated in FIGS. 5 and 6, shift block members 124, 126, 128 and 130 define a generally transversely extending slot 132, which extends in the direction of arrow 134. During a gear ratio interchange, shift finger 108 may be moved in a generally transverse direction through slot 132 to align shift finger 108 with contact surfaces 134 and 136, which are defined by slot 132 on each of shift block members 124, 126, 128 and 130. Additionally, a generally axially extending channel 137 is formed between each shift block member 124, 126, 128 and 130, having a width that is greater than the width of shift finger 108. If required, shift finger 108 may be moved in a generally axial direction within each channel 137 to select any shift block member 124, 126, 128 and 130, even when one or more shift block members are axially removed from the neutral position.

To fix first countershaft 40 for rotation with second countershaft 42, shift finger 108 is moved transversely through slot 132 and into alignment with surfaces 134, 136 on shift block member 124, as shown in FIG. 6. Shift finger 108 is then moved axially in the direction of arrow 138 to contact surface 136 and axially move shift rail 110, shift fork 114 and clutch 90. Similarly, to engage and disengage the high and low speeds associated with second countershaft 42 and second prime mover 26, shift finger 108 is moved into alignment with surfaces 134, 136 on shift block member 126. Shift finger 108 is then moved axially in the direction of arrow 138 to contact one of surfaces 134 or 136 to axially move shift rail 111, shift fork 116 and clutch 88.

To engage or disengage the first and second speeds associated with first countershaft 40 and first prime mover 22, shift finger 108 is moved transversely into alignment with surfaces 134, 136 on shift block member 128. Shift finger 108 is the moved axially in the direction of arrow 138 to contact one of surfaces 134 or 136 to axially move shift rail 112, shift fork 118 and clutch 86. Similarly, to engage and disengage the third and fourth speeds associated with first countershaft 40 and first prime mover 22, shift finger 108 is moved into alignment with surfaces 134, 136 on shift block member 130. Shift finger 108 is then moved axially in the direction of arrow 138 to contact one of surfaces 134 or 136 to axially move shift rail 113, shift fork 120 and clutch 84.

It is also possible to operate shift control mechanism 98 in a way that results in more than one of shift block members 124, 126, 128 and 130 being in a non-neutral position simultaneously. For example, as described above, second prime mover 26 may be selectively operated to provide a torque break between first countershaft 40 and main shaft 44. Application of a torque break between first countershaft 40 and main shaft 44 allows clutch 84 or 86 to be disengaged from the corresponding first prime mover driven ratio gear on main shaft 44. When such a gear ratio interchange is requested, second prime mover 26 can momentarily increase the torque applied to main shaft 44 by axially moving clutch 88 to fix main shaft 44 for rotation with one of ratio gears 72 and 74. In this example, shift block member 128 or 130 will reside in a non-neutral position when one of the first prime mover driven ratio gears is fixed for rotation with main shaft 44. To engage clutch 88, shift finger 108 can be moved through channel 137 between shift block member 128 and 130 to a position that enables it to be moved transversely in slot 132 over to shift block 126. Shift finger 108 can then be moved axially in the direction of arrow 138 to axially move shift rail 111, shift fork 116 and clutch 88 to fix one of gears 72, 74 for rotation with main shaft 44.

In another example, it may be desirable to operate first and second prime movers 22 and 26 simultaneously, while one of ratio gears 64, 66, 70 or first transmission input shaft 32 are engaged to drive main shaft 44. To illustrate, while shift rail 112 is operating in a position that causes clutch 86 to be engaged with ratio gear 66 on main shaft 44, shift rail 111 may be actuated to a position that causes clutch 88 to engage ratio gear 72 for rotation with main shaft 44.

Although gear changes in transmission 24 are described as being controlled by a shift rail assembly, powertrain system 20 is not intended to be limited thereto. Alternatively, for example, clutches 84, 86, 88 and/or 90 may be hydraulically operated without the use of a rail-type shift control mechanism. Furthermore, as shown in FIG. 2A, clutches 84, 86, 88 or 90 may also be provided on first and second countershafts 40, 42 to engage and disengage the ratio gears rotatably supported on countershafts 40, 42 in a manner substantially similar to the manner in which the ratio gears are engaged on main shaft 44.

In the absence of a main clutch 28 between first prime mover 22 and transmission 24, a vehicle employing powertrain system 20 is generally launched solely under the power of second prime mover 26. As described above, when first prime mover 22 functions as an engine, the engine may be started prior to launching the vehicle, which requires clutch 90 to fix first connecting gear 92 for rotation with second connecting gear 94. Alternatively, the engine can be started after the vehicle is launched and traveled some distance solely under the power of second prime mover 26. After the engine is brought up to speed, first countershaft 40 is synchronized with and fixed for rotation with main shaft 44 under control of ECU 30.

Figure 7:
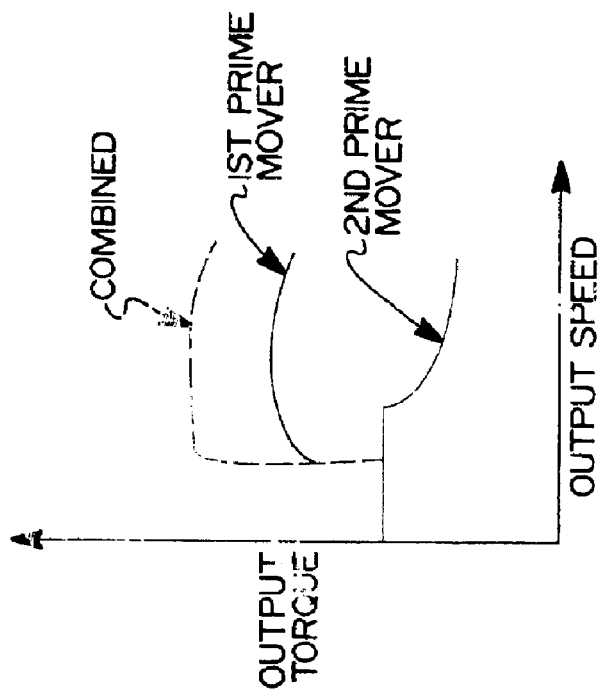
FIG. 7 is an exemplary graphical representation of output torque versus output speed characteristics of a first prime mover and a second prime mover, both individually and combined.

Once launched, the vehicle can be driven forward under the power of first prime mover 22, second prime mover 26 or a combination of these components. Referring to FIG. 7, when both first prime mover 22 and second prime mover 26 are fixed for driving rotation with main shaft 44, the torque curves of each prime mover complement one another to produce a favorable overall torque-speed curve. First prime mover 22 may also be used to bring the vehicle safely to rest if operation of second prime mover 26 fails. However, unless powertrain system 20 is provided with a main clutch 28, it will not be feasible to re-launch the vehicle under the power of first prime mover 22 alone.

If reverse operation of the vehicle is required, ratio gear 74 is fixed for rotation with main shaft 44 by clutch 88 and second prime mover 26 is rotated in a direction opposite its normal forward rotating direction. Alternatively, ratio gear 72 on main shaft 88 may be engaged, if desired, during reverse operation. First prime mover 22 provides no torque to main shaft 44 during reverse operation of the vehicle.

Second prime mover 26 may also be used to provide the vehicle with an "anti-rollback" feature, i.e., application of torque to assist the vehicle operator in holding the vehicle at rest in stopped traffic or on a grade. Depending on the weight of the vehicle and the grade to be held, full torque slip of second prime mover 26 functioning as an electric motor would be less than approximately 1–2% of full motor speed. Using an electric motor to provide "anti-rollback" torque is more efficient than using first prime mover 22 functioning as an engine, which would require at least approximately 25% full torque slip to hold a grade.

During vehicle braking, second prime mover 26 may be selectively driven by main shaft 44, through second countershaft 42, as an electric generator or a hydraulic pump to recharge energy storage device 31. Known as "regenerative braking," this braking complements conventional friction braking to reduce the speed of the vehicle. During regenerative braking, ECU 30 selectively controls operation of first prime mover 22, second prime mover 26 and transmission 24 for appropriate energy recapture. For example, during vehicle braking, clutch 88 may be moved axially to fix either ratio gear 72 or 74 for rotation with main shaft 44. Rotation of main shaft 44 is then used to drive second countershaft 42 and second prime mover 26. When operating as an electric generator, second prime mover 26 recharges a battery or bank of batteries. When operating as a hydraulic pump, second prime mover 26 recharges a hydraulic accumulator. To eliminate drag and increase the regenerative efficiency of regenerative braking, first prime mover 22 may be selectively disengaged from main shaft 44. However, during steep downhill descent, ECU 30 may be programmed to allow first prime mover 22 to remain engaged with main shaft 44 during vehicle braking, to maintain the stability of the vehicle.

Another feature of the present invention is that first prime mover 22 can be used to drive second prime mover 26 as an electric generator or hydraulic pump to recharge energy storage device 31. While the vehicle is at rest, clutch 90 may be selectively actuated to fix first connecting gear 92 for rotation with second connecting gear 94 to couple second countershaft 42 for rotation with first countershaft 40, as described above. Due to the properties of a four quadrant motor drive, energy storage device 31 functioning as a battery, bank of batteries or a capacitor may also be recharged while the vehicle is at cruise by engaging one of ratio gears 72 and 74 for rotation with main shaft 44. When second prime mover 26 functions as an electric generator, first prime mover 22 may be used to selectively drive second prime mover 26 to supply dc or ac electric power for on-board or off-board electrical equipment via the existing drive inverter. Similarly, when second prime mover 26 functions as a hydraulic pump, first prime mover 22 may be used to selectively drive second prime mover 26 to provide fluid power for on-board or off-board hydraulic equipment.

Figure 8:
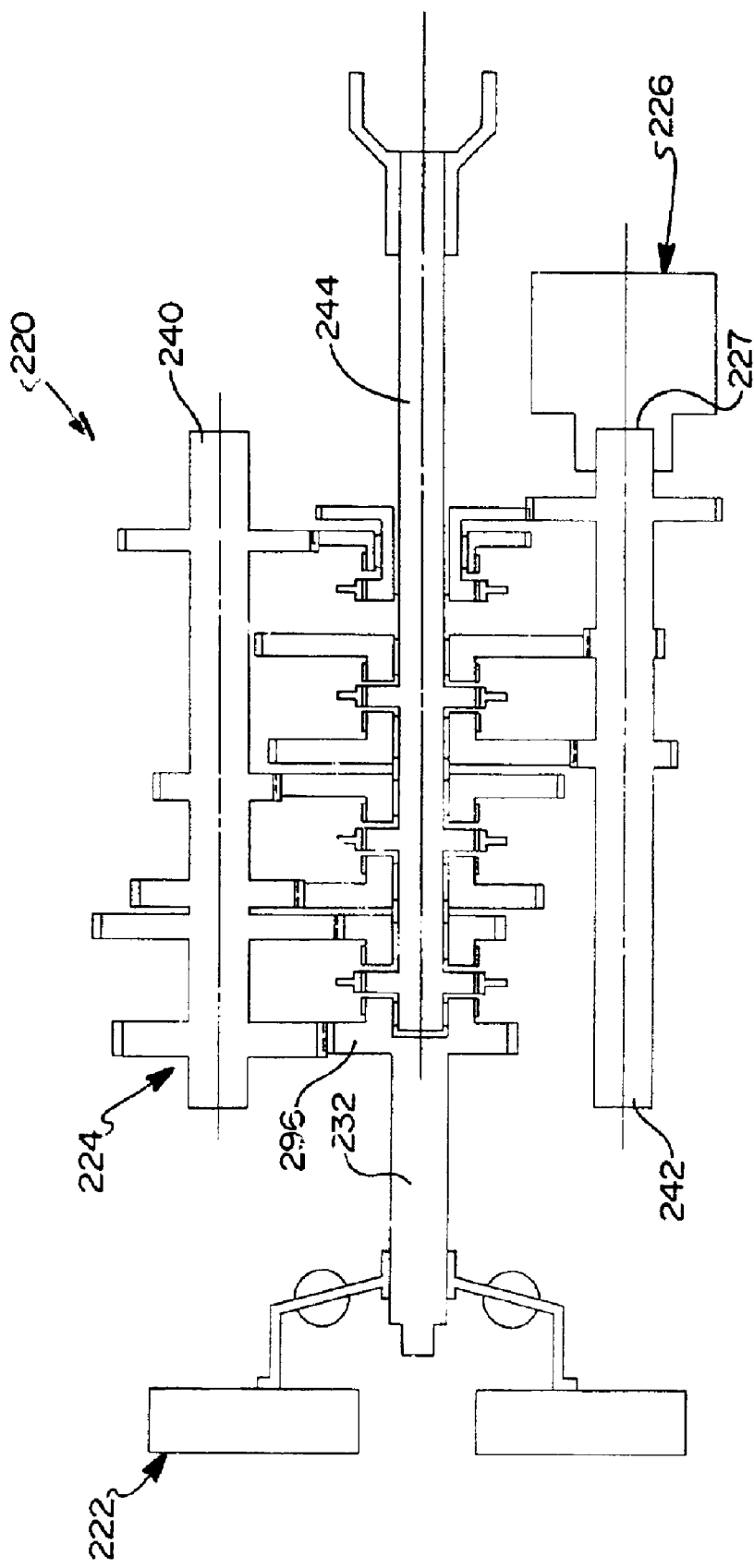
FIG. 8 is a schematic illustration of a hybrid powertrain system according to another embodiment of the present invention.

Referring to FIG. 8, another embodiment of powertrain system 20 will be described in detail. In this embodiment, a powertrain system 220 is provided that includes a first prime mover 222, such as a spark-ignited or compression-ignited internal combustion engine, a change-gear transmission 224 and a second prime mover 226, such as a electric motor/generator or hydraulic motor/pump. Transmission 224 includes a pair of countershafts 240 and 242 that are rotatably supported by a transmission housing (not illustrated), and a main shaft 244 that is also rotatably supported by the transmission housing. First and second countershafts 240 and 242, main shaft 244 and the various ratio gears supported thereon, are substantially similar to those components described in the first embodiment and will not be described in further detail herein.

First prime mover 222 is drivingly connected to a transmission input shaft 232, which is connected to first countershaft 240 via a headset gear 296. Unlike powertrain system 20, as illustrated in FIG. 2, the output of second prime mover 226 is directly connected to a first end 227 of second countershaft 242, eliminating the use of headset gears between second prime mover 226 and second countershaft 242. In this embodiment, second prime mover 226 is preferably disposed outside the transmission housing (not illustrated) and connected to second countershaft 242 through a wall of the transmission housing. Operation of first prime mover 222, second prime mover 226 and transmission 224 is substantially similar to that described in the first embodiment and will not be described in further detail herein.

Figure 9:
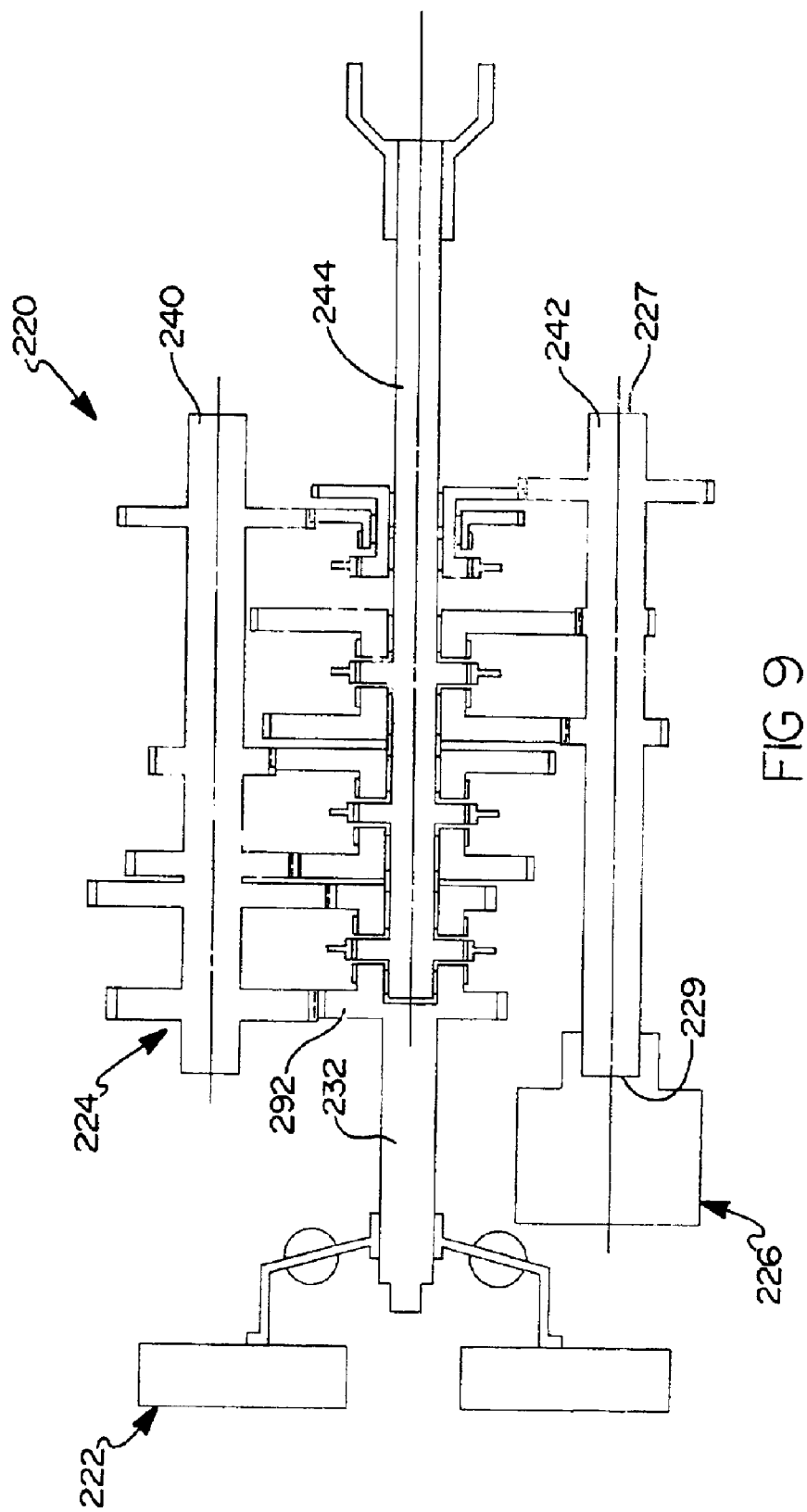
FIG. 9 is a schematic illustration of an alternate embodiment of the hybrid powertrain system shown in FIG. 8.
Figure 10:
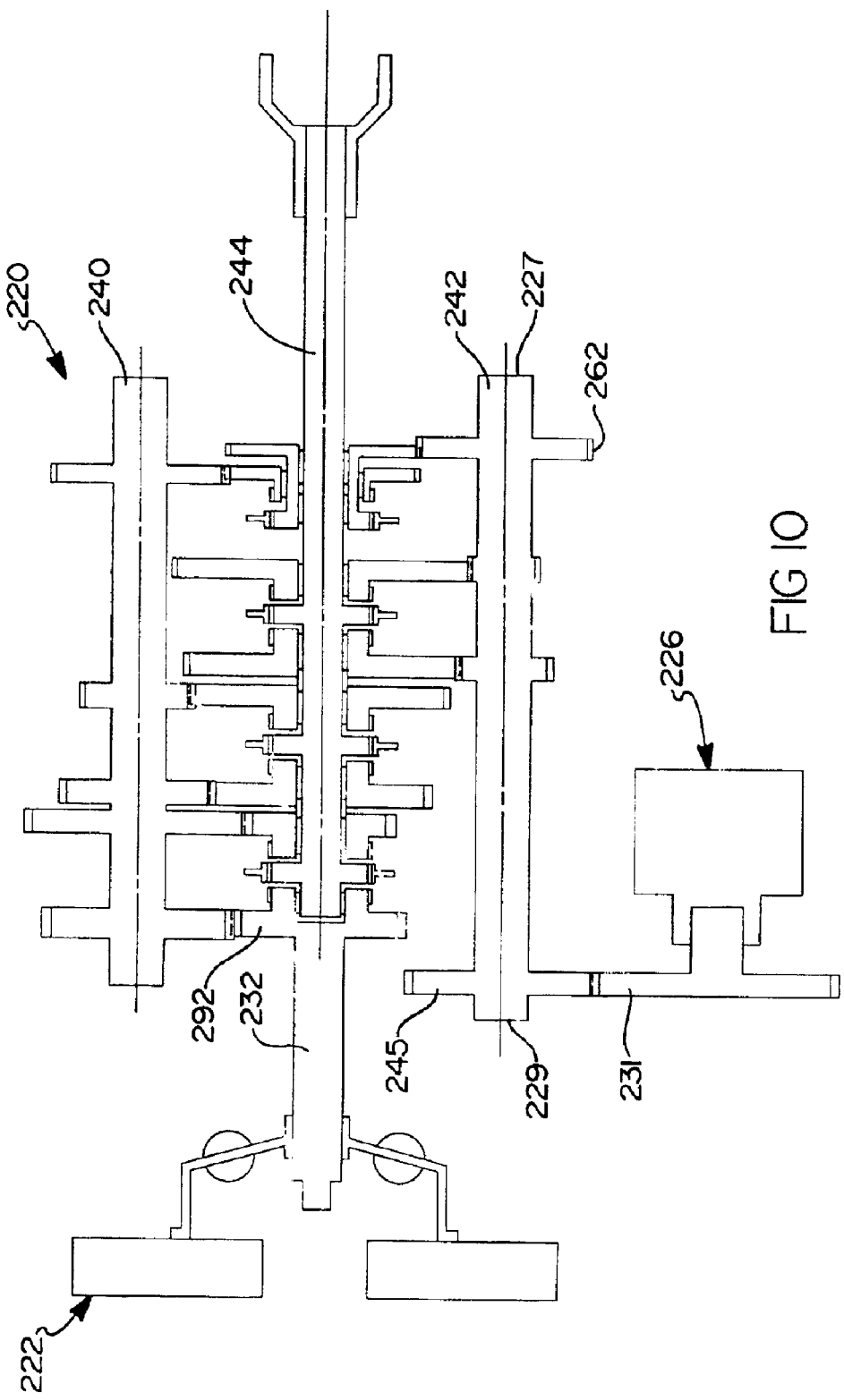
FIG. 10 is a schematic illustration of an alternate embodiment of the hybrid powertrain system shown in FIG. 9.

Referring to FIGS. 9 and 10, alternate embodiments of powertrain system 220 are described in detail. In the embodiment illustrated in FIG. 9, the output of second prime mover 226 is directly connected to a second end 229 of second countershaft 242 between first prime mover 222 and transmission 224. When space between first prime mover 222 and transmission 224 is limited, second prime mover 226 can be positioned laterally adjacent transmission 224 and connected to second countershaft 242 by headset gears 231 and 245, as illustrated in FIG. 10. Although not illustrated, second prime mover 226 may also be drivingly connected to first end 227 of second countershaft 242, when positioned laterally adjacent transmission 224, by meshing headset gear 231 with ratio gear 262. Operation of first prime mover 222, second prime mover 226 and transmission 224 is substantially similar to that described in the first embodiment and will not be described in further detail herein.

Figure 11:
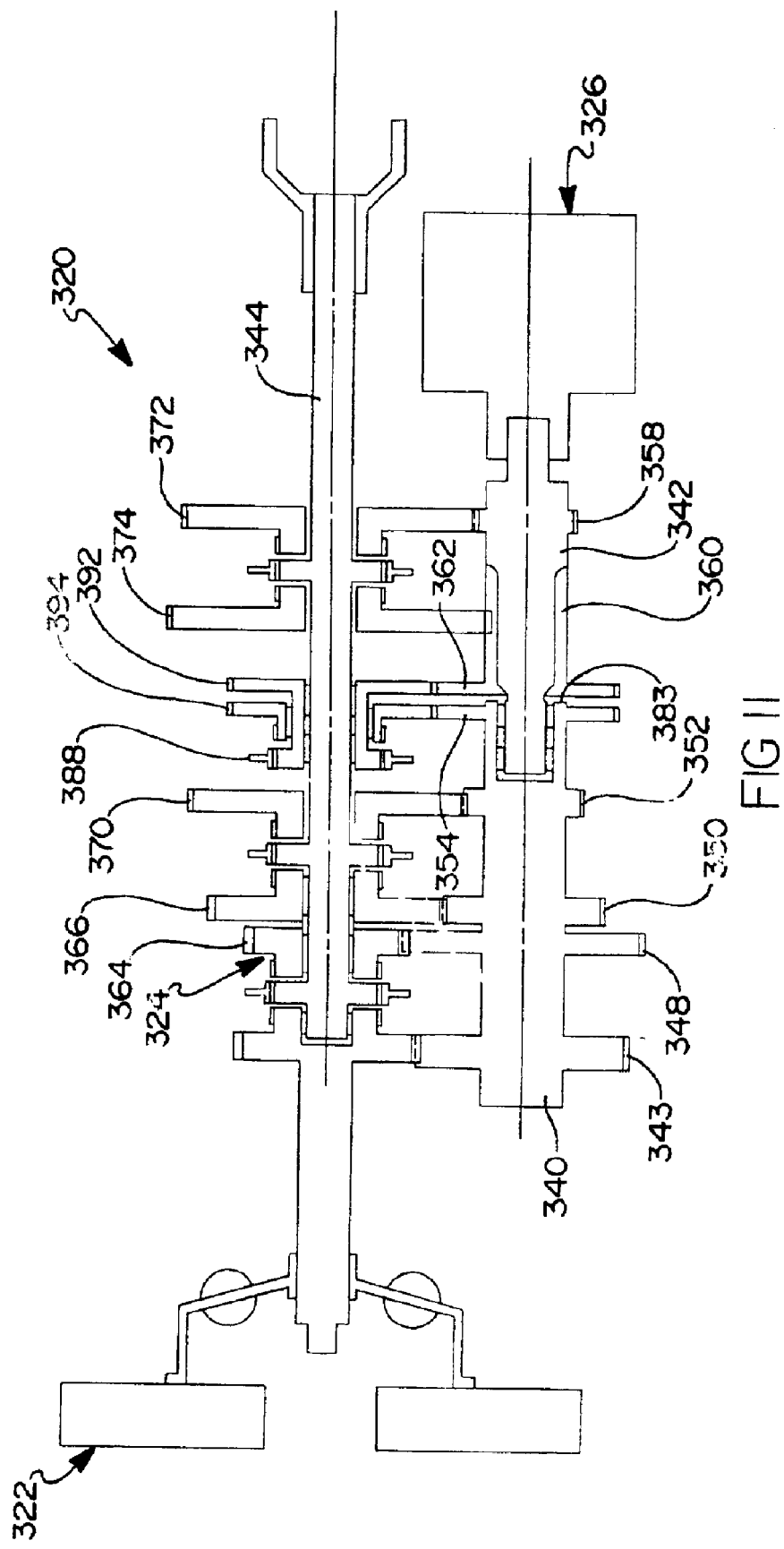
FIG. 11 is a schematic illustration of a hybrid powertrain system according to another embodiment of the present invention.

Referring to FIG. 11, another embodiment of powertrain system 20 is described in detail. In this embodiment, a powertrain system 320 is provided that a includes a first prime mover 322, such as a spark-ignited or compression-ignited internal combustion engine, a change-gear transmission 324 and a second prime mover 326, such as an electric motor/generator or hydraulic motor/pump. Transmission 324 includes a main shaft 244 and a pair of coaxially aligned countershafts 340 and 342 rotatably supported laterally adjacent main shaft 344. A first countershaft 340, which is rotatably driven by first prime mover 322, carries thereon a plurality of ratio gears 348, 350 and 352. A second countershaft 342, which is rotatably driven by second prime mover 226, carries thereon ratio gears 358, 360 and 362. To reduce the cooperative length of first countershaft 340 and second countershaft 342, a portion of second countershaft 342 may be rotatably supported within first countershaft 340, as illustrated in FIG. 11, or vice versa.

As in the above described embodiments, ratio gears 364, 366 and 370 are rotatably supported on main shaft 344 and are continually meshed with ratio gears 348, 350 and 352, respectively, on first countershaft 340. Similarly, ratio gears 372 and 374 are rotatably supported on main shaft 344 and are continually meshed with ratio gears 358 and 360, respectively, on second countershaft 342.

As required, first countershaft 340 may be selectively fixed for rotation with second countershaft 342. As in the above-described embodiments, second countershaft 342 includes a gear 362 that is continually meshed with a first connecting gear 392 that is rotatably supported on main shaft 344. First countershaft 340 includes a gear 354 that is continually meshed with a second connecting gear 394 that is rotatably supported on first connecting gear 392. When fixed rotation of first countershaft 340 with second countershaft 342 is desired, a clutch 388 is moved axially to fix rotation of second connecting gear 394 with first connecting gear 392. Remaining operation of first prime mover 322, second prime mover 326 and transmission 324 is substantially similar to that in the above-described embodiments and will not be described in further detail herein.

Referring to FIG. 12, an alternate embodiment of powertrain system 320 is described in detail. In this embodiment, first countershaft 340 and second countershaft 342 are substantially similar to those components illustrated in FIG. 11 with at least one exception, namely, second countershaft 342 extends coaxially through first countershaft 340 and is connected to second prime mover 326 proximate a second end 329 of second countershaft 342. First prime mover 322 is drivingly connected to a first transmission input shaft 332 that is disposed concentrically within a second transmission input shaft 334 driven by second prime mover 326. Depending on the output characteristics of second prime mover 326, second transmission input shaft 334 may be rotatably connected to second countershaft 342 through an optional planetary gear mechanism or geartrain 376. Alternatively, second prime mover 326 may be positioned laterally adjacent transmission 324 and connected to second countershaft 342 via a headset gear 331 (both illustrated in phantom), or coupled directly to second end 329 of second countershaft 342 in a manner similar to that illustrated in FIG. 9.

From the above description it should now be apparent that hybrid powertrain system 20 has many advantages over prior art powertrain systems, particularly conventional engine/transmission systems. Among other advantages, second prime mover 26 functioning in cooperation with second countershaft 42 can be used to maintain torque on main shaft 44 during a shift sequence between first countershaft 40 and main shaft 44. Similarly, first prime mover 22 functioning in cooperation with first countershaft 40 can be used to maintain torque on main shaft 44 during a shift sequence between second countershaft 42 and main shaft 44. Utilizing the output torque of either first prime mover 22 or second prime mover 26 during a shift interchange to maintain torque on main shaft 44 minimizes torque interruption at the drive wheels, which improves the shift smoothness and shift quality of powertrain system 20 and enables automated power shifting of transmission 24.

Another advantage is that second prime mover 26, operating as a motor, can be used to supplement the torque provided by first prime mover 22 during acceleration to improve the fuel economy through downsizing of the engine relative to the size required for engine launch and acceleration alone. Another advantage is that second prime mover 26 may be used to launch the vehicle, thereby eliminating the need for a main clutch 28. Additionally, second prime mover 26 may be employed as a motor to drive the vehicle in reverse, thereby eliminating the need for reverse idler gearing to reduce transmission complexity.

Another advantage is that second prime mover 26 may be operated as a motor to start first prime mover 22 functioning as an engine, thus reducing the mass and space needed for a conventional starter motor. Still another advantage over prior art powertrain systems is the virtual elimination of the undesirable parasitic load on the powertrain resulting from second prime mover 26 drag when the vehicle is cruising under the sustained power of first prime mover 22.

Another advantage is that second prime mover 26 can be operated as a motor to provide a torque break between first and second countershafts 40, 42 and main shaft 44 during a gear ratio interchange. Similarly, first prime mover 22 can be operated to provide a torque break between second countershaft 42 and main shaft 44 during a ratio interchange.

Additionally, when operating as an electric generator or hydraulic pump, second prime mover 26 may be selectively operated to recover electrical or hydraulic energy during vehicle braking, to enhance fuel economy. Another advantage is that energy storage device 31 may be recharged while the vehicle is at rest or while the vehicle is moving, by providing a connecting gearset between first countershaft 40 and second countershaft 42. Still another advantage, is that second prime mover 26 can be operated as an electric generator or hydraulic pump to power on-board or off-board electric or hydraulic devices, while the vehicle is either at rest or moving.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A powertrain system comprising:
    a first prime mover having a rotational output;
    a second prime mover having a rotational output; and
    a change-gear transmission that includes a main shaft supporting at least two main shaft gears thereon, a first independent countershaft connected to the first prime mover and including at least one ratio gear meshing with a respective main shaft gear, a second independent countershaft connected to the second prime mover and having at least two ratio gears supported thereon and meshing with respective main shaft gears, the ratio gears on the first and second countershafts cooperating with the main shaft gears to provide at least one gear ratio between each of the first and second countershafts and the main shaft, and a shift control mechanism that selectively fixes the main shaft for rotation with the first and second countershafts; and
    wherein the gears on the main shaft are selectively engaged therewith to provide at least two drive ratios between the second countershaft and the main shaft and selectively interchanged by the shift control mechanism to change the drive ratio from a first ratio to a second ratio, and wherein the first prime mover is selectively operable to provide a torque break between the second countershaft and the main shaft to facilitate a gear ratio interchange therebetween.

2. The powertrain system of claim 1, further including a first transmission input shaft connecting the first prime mover to the first countershaft.

3. The powertrain system of claim 2, further including a main clutch between the first prime mover and the first transmission input shaft.

4. The powertrain system of claim 2, further including a second transmission input shaft connecting the second prime mover to the second countershaft.

5. The powertrain system of claim 4, wherein the first transmission input shaft is disposed concentrically within the second transmission input shaft.

6. The powertrain system of claim 4, wherein rotation of the second transmission input shaft undergoes a speed change prior to connecting with the second countershaft.

7. The powertrain system of claim 6, wherein a planetary gear mechanism is disposed between the second transmission input shaft and the second countershaft to change the speed of the second transmission input shaft.

8. The powertrain system of claim 1, wherein the first countershaft supports at least two ratio gears thereon.

9. The powertrain system of claim 8, wherein the second prime mover is selectively operable in cooperation with the second countershaft to maintain torque on the main shaft during a gear ratio interchange between the first countershaft and the main shaft.

10. The powertrain system of claim 8, wherein the gears on the main shaft are selectively engaged therewith to provide at least two drive ratios between each of the first and second countershafts and the main shaft and selectively interchanged by the shift control mechanism to change the drive ratio from a first ratio to a second ratio, and wherein the second prime mover is selectively operable to provide a torque break between each of the first and second countershafts and the main shaft to facilitate a gear ratio interchange therebetween.

11. The powertrain system of claim 1, wherein the first prime mover is selectively operable in cooperation with the first countershaft to maintain torque on the main shaft during a gear ratio interchange between the second countershaft and the main shaft.

12. The powertrain system of claim 1, wherein the main shaft gears are rotatably supported on the main shaft.

13. The powertrain system of claim 1, further including a connecting gearset that selectively fixes the first countershaft for rotation with the second countershaft.

14. The powertrain system of claim 1, wherein the shift control mechanism comprises a shift rail assembly.

15. The powertrain system of claim 1, wherein the second countershaft includes a forward end facing the first prime mover and a rearward end facing a direction opposite the forward end, and wherein the second prime mover is connected to one of the forward end and the rearward end of the second countershaft.

16. The powertrain system of claim 15, wherein an output of the second prime mover is directly connected to the second countershaft.

17. The powertrain system of claim 15, wherein the second prime mover is positioned laterally adjacent the transmission and connected to the second countershaft by at least one headset gear.

18. The powertrain system of claim 1, wherein the second countershaft is coaxially aligned with the first countershaft.

19. The powertrain system of claim 18, wherein a portion of the second countershaft extends through the first countershaft to a forward end facing the first prime mover, and wherein the second prime mover is connected to the forward end of the second countershaft.

20. A powertrain system comprising:
    a first prime mover having a rotational output;
    a second prime mover having a rotational output; and
    a change-gear transmission that includes a main shaft supporting at least two main shaft gears thereon, a first independent countershaft connected to the first prime mover and including at least one ratio gear meshing with a respective main shaft gear, a second independent countershaft connected to the second prime mover and having at least one ratio gear meshing with a respective main shaft gear, the ratio gears on the first and second countershafts cooperating with the main shaft gears to provide at least one gear ratio between each of the first and second countershafts and the main shaft, a shift control mechanism that selectively fixes the main shaft for rotation with the first and second countershafts, and a connecting gearset that selectively fixes the first countershaft for rotation with the second countershaft, the connecting gearset including a first connecting gear rotatably supported on the main shaft and connected to one of the first and second countershafts, and a second connecting gear rotatably supported on the first connecting gear and connected to the other countershaft.

21. The powertrain system of claim 20, wherein the connecting gearset further includes a clutch operated by the shift control mechanism for selectively fixing the first connecting gear for rotation with the second connecting gear.

22. A powertrain system comprising:
    a first prime mover having a rotational output;
    a second prime mover having a rotational output; and
    a change-gear transmission that includes a main shaft supporting at least two main shaft gears thereon, a first independent countershaft connected to the first prime mover and including at least one ratio gear meshing with a respective main shaft gear, a second independent countershaft connected to the second prime mover and having at least one ratio gear meshing with a respective main shaft gear, the ratio gears on the first and second countershafts cooperating with the main shaft gears to provide at least one gear ratio between each of the first and second countershafts and the main shaft, and a shift rail assembly that selectively fixes the main shaft for rotation with the first and second countershafts, the shift rail assembly including at least two independently moveable, generally transversely spaced and generally longitudinally extending shift rails mounted for axial sliding movement in opposite directions from a neutral position, the shift rails each carrying a shift fork thereon for engagement and disengagement of at least one gear in the transmission, the shift rail assembly also including a shift block member carried by each shift rail, each shift block member defining a pair of longitudinally spaced and opposing generally transversely extending surfaces having a width therebetween sufficient to allow passage of a shift lever in a generally transverse direction, the shift lever operable to engage one of the opposing generally transversely extending surfaces of a shift block to move the corresponding shift rail in an axial direction, the shift block members further defining a generally axially extending channel therebetween having a width sufficient to allow passage of the shift lever in a generally axial direction.

23. The powertrain system of claim 22, wherein one of the shift rails is selectively moveable from the neutral position to at least one axially displaced position while the other shift rail is disposed in a position axially displaced from the neutral position.

24. The powertrain system of claim 22, wherein each shift block member is selectively moveable from the neutral position to an axially displaced position that causes at least one of:
   (i) the main shaft to become engaged for rotation with the first countershaft,
   (ii) the main shaft to become engaged for rotation with the second countershaft, and
   (iii) the first countershaft to become engaged for rotation with the second countershaft.

25. The powertrain system of claim 22, wherein the shift rail assembly includes a plurality of shift rails, each shift rail carrying a shift fork for engagement and disengagement of at least one gear ratio in the transmission and a shift block member for movement therewith.

26. The powertrain system of claim 25, wherein at least one of the shift rails is selectively moveable from the neutral position to at least one axially displaced position while at least one of the other shift rails is disposed in a position axially displaced from the neutral position.

27. A powertrain system comprising:
   a first prime mover having a rotational output;
   a second prime mover having a rotational output; and
   a change-gear transmission that includes a main shaft supporting at least two main shaft gears thereon, a first independent countershaft connected to the first prime mover and including at least one ratio gear meshing with a respective main shaft gear, a second independent countershaft connected to the second prime mover and having at least one ratio gear meshing with a respective main shaft gear, the ratio gears on the first and second countershafts cooperating with the main shaft gears to provide at least one gear ratio between each of the first and second countershafts and the main shaft, a transmission input shaft connecting the first prime mover to the first countershaft, and a shift control mechanism that selectively fixes the main shaft for rotation with the first and second countershafts;

a main clutch positioned between the first prime mover and the first transmission input shaft; and wherein at least one of the first and second prime movers is configured to provide a torque break between at least one of the first and second countershafts and the main shaft to facilitate a gear ratio interchange therebetween.

28. A powertrain system comprising:
   a first prime mover having a rotational output;
   a second prime mover having a rotational output; and
   a change-gear transmission that includes a main shaft supporting at least two main shaft gears thereon, a first independent countershaft connected to the first prime mover and including at least one ratio gear meshing with a respective main shaft gear, a second independent countershaft connected to the second prime mover and having at least one ratio gear meshing with a respective main shaft gear, the ratio gears on the first and second countershafts cooperating with the main shaft gears to provide at least one gear ratio between each of the first and second countershafts and the main shaft, a first transmission input shaft connecting the first prime mover to the first countershaft, a second transmission input shaft connecting the second prime mover to the second countershaft, the first transmission input shaft disposed concentrically within the second transmission input shaft, and a shift control mechanism that selectively fixes the main shaft for rotation with the first and second countershafts; and wherein at least one of the first and second prime movers is configured to provide a torque break between at least one of the first and second countershafts and the main shaft to facilitate a gear ratio interchange therebetween.

29. A powertrain system comprising:
   a first prime mover having a rotational output;
   a second prime mover having a rotational output; and
   a change-gear transmission that includes a main shaft supporting at least two main shaft gears thereon, a first independent countershaft connected to the first prime mover and including at least two ratio gears supported thereon and meshing with respective main shaft gears, a second independent countershaft connected to the second prime mover and having at least one ratio gear meshing with a respective main shaft gear, the ratio gears on the first and second countershafts cooperating with the main shaft gears to provide at least one gear ratio between each of the first and second countershafts and the main shaft, and a shift control mechanism that selectively fixes the main shaft for rotation with the first and second countershafts; and wherein the gears on the main shaft are selectively engaged therewith to provide at least two drive ratios between each of the first and second countershafts and the main shaft and selectively interchanged by the shift control mechanism to change the drive ratio from a first ratio to a second ratio, and wherein the second prime mover is selectively operable to provide a torque break between each of the first and second countershafts and the main shaft to facilitate a gear ratio interchange therebetween.

30. A powertrain system comprising:

a first prime mover having a rotational output;

a second prime mover having a rotational output; and a change-gear transmission that includes a main shaft, a first torque path defined between the first prime mover and the main shaft for transmitting the rotational output of the first prime mover to the main shaft, and a second torque path defined between the second prime mover and the main shaft for independently transmitting the rotational output of the second prime mover to the main shaft, the first torque path being defined by a first countershaft and the second torque path defined by a second countershaft; and wherein each of the first and second countershafts support thereon at least one ratio gear that meshes with a respective main shaft gear to provide at least one gear ratio between each of the first and second countershafts and the main shaft, the gears on the main shaft are selectively engaged therewith to provide at least two drive ratios between each of the first and second countershafts and the main shaft and selectively interchanged by a shift control mechanism to change the drive ratio from a first ratio to a second ratio, and wherein the second prime mover is selectively operable to provide a torque break between each of the first and second countershafts and the main shaft to facilitate a gear ratio interchange therebetween.

31. A powertrain system comprising:

a first prime mover having a rotational output;

a second prime mover having a rotational output; and a change-gear transmission that includes a main shaft, a first torque path defined between the first prime mover and the main shaft for transmitting the rotational output of the first prime mover to the main shaft, and a second torque path defined between the second prime mover and the main shaft for independently transmitting the rotational output of the second prime mover to the main shaft, the first torque path being defined by a first countershaft and the second torque path defined by a second countershaft; and wherein each of the first and second countershafts support thereon at least one ratio gear that meshes with a respective main shaft gear to provide at least one gear ratio between each of the first and second countershafts and the main shaft, the gears on the main shaft are selectively engaged therewith to provide at least two drive ratios between the second countershaft and the main shaft and selectively interchanged by a shift control mechanism to change the drive ratio from a first ratio to a second ratio, and wherein the first prime mover is selectively operable to provide a torque break between the second countershaft and the main shaft to facilitate a gear ratio interchange therebetween.

32. The powertrain system of claim 31, wherein the second prime mover is selectively operable in cooperation with the second countershaft to maintain torque on the main shaft during a gear ratio interchange between the first countershaft and the main shaft.

33. The powertrain system of claim 31, wherein the gears on the main shaft are selectively engaged therewith to provide at least two drive ratios between each of the first and second countershafts and the main shaft and selectively interchanged by the shift control mechanism to change the drive ratio from a first ratio to a second ratio, and wherein the second prime mover is selectively operable to provide a torque break between each of the first and second countershafts and the main shaft to facilitate a gear ratio interchange therebetween.

34. The powertrain system of claim 31, wherein the first prime mover is selectively operable in cooperation with the first countershaft to maintain torque on the main shaft during a gear ratio interchange between the second countershaft and the main shaft.

35. The powertrain system of claim 31, wherein the second countershaft includes a forward end facing the first prime mover and a rearward end facing a direction opposite the forward end, and wherein the second prime mover is connected to one of the forward end and the rearward end of the second countershaft.

36. The powertrain system of claim 35, wherein an output of the second prime mover is directly connected to the second countershaft.

37. The powertrain system of claim 35, wherein the second prime mover is positioned laterally adjacent the transmission and connected to the second countershaft by at least one headset gear.

38. The powertrain system of claim 31, wherein the second countershaft is coaxially aligned with the first countershaft.

39. The powertrain system of claim 38, wherein a portion of the second countershaft extends through the first countershaft to a forward end facing the first prime mover, and wherein the second prime mover is connected to the forward end of the second countershaft.

* * * * *